(12) United States Patent
Nitsche et al.

(10) Patent No.: US 7,136,779 B2
(45) Date of Patent: Nov. 14, 2006

(54) METHOD FOR SIMPLIFIED REAL-TIME DIAGNOSES USING ADAPTIVE MODELING

(75) Inventors: Christof Nitsche, Davis, CA (US); Stefan Schroedl, San Francisco, CA (US); Wolfgang Weiss, Gold River, CA (US)

(73) Assignee: DaimlerChrysler AG, Stuttgart (DE)

( * ) Notice: Subject to any disclaimer, the term of this patent is extended or adjusted under 35 U.S.C. 154(b) by 144 days.

(21) Appl. No.: 10/855,315

(22) Filed: May 28, 2004

(65) Prior Publication Data

US 2005/0278146 A1 Dec. 15, 2005

(51) Int. Cl.
*G06F 11/30* (2006.01)
(52) U.S. Cl. ......................................... 702/183; 703/8
(58) Field of Classification Search .................. 702/35, 702/41, 66–67, 71, 81, 84, 113, 145, 182–183; 703/7–8, 17–18
See application file for complete search history.

(56) References Cited

U.S. PATENT DOCUMENTS

| | | | | |
|---|---|---|---|---|
| 5,355,749 A | * | 10/1994 | Obara et al. ................... 477/20 |
| 5,898,282 A | * | 4/1999 | Drozdz et al. .............. 318/139 |
| 6,085,183 A | * | 7/2000 | Horn et al. ................... 706/45 |
| 6,609,051 B1 | | 8/2003 | Fiechter et al. ............... 701/33 |
| 6,625,539 B1 | * | 9/2003 | Kittell et al. ................ 701/213 |
| 6,792,341 B1 | * | 9/2004 | Hunt et al. .................... 701/22 |
| 6,837,115 B1 | * | 1/2005 | Mansky ................. 73/862.046 |
| 6,893,756 B1 | * | 5/2005 | Clingerman et al. .......... 429/22 |
| 6,909,959 B1 | * | 6/2005 | Hallowell ..................... 701/88 |

* cited by examiner

*Primary Examiner*—Marc S. Hoff
*Assistant Examiner*—Mary Catherine Baran
(74) *Attorney, Agent, or Firm*—Crowell & Moring LLP

(57) ABSTRACT

A method for on-board real-time diagnostics of a mobile technical system using an adaptive technique to approximate stationary characteristic curves resulting from a workshop test. This adaptive technique uses observed non-stationary normal driving data to eliminate confounding variables.

15 Claims, 3 Drawing Sheets

METHOD FOR SIMPLIFIED REAL-TIME DIAGNOSES USING ADAPTIVE MODELING

BACKGROUND AND SUMMARY OF THE INVENTION

The present invention relates to on-board real-time diagnostics of mobile technical systems.

In order to detect faults or monitor ageing processes in vehicle systems, the normal procedure involves bringing the system into a mechanical workshop where the behavior can be tested using predefined and controlled conditions. Design tolerances and references can then be compared with measured variables to provide an accurate estimate concerning not only individual items but also the overall functioning and degradation of the system.

An internal combustion engine can be characterized by an engine speed/torque curve. A corresponding analysis tool for a fuel cell powertrain is a polarization curve as shown in FIG. 2. This polarization curve shows the effect of discharging current from a fuel cell system on the cell voltage and power. The curve is usually derived from a specifically designed dynamometer test cycle where the current and voltage are recorded at predefined static load points. The polarization curve, such as shown FIG. 2, results from an interpolation of those static load points.

The present invention results from a recognition that accomplishing of this diagnostics on an on-board component in real-time during normal driving would be a valuable tool not only for customers and field technicians, but also for development engineers. The ability to have a real-time diagnostics would lead to lower maintenance cost, faster problem resolution and shorter design cycles. It has also been recognized that the task of such on-line diagnostics is very complex with a principle obstacle being the range of varying dynamic influences. For example, with fuel cell stacks, the operational temperature, air/hydrogen gas temperatures and pressures inside the stack and the recordings of the fuel cell voltage and current lead to a range of uncertainty of the measurement points instead of more defined points recorded at predefined static loads. This comparison can be seen in FIG. 3 which compares work bench test data with data during normal driving.

This range of uncertainty in the factors can be attributed to both the external environment as well as control strategies of different system components. The system is rarely in equilibrium. As an example, the polarization of a fuel cell depends not only on the current load request, but also on the pressure on the air and hydrogen side. Furthermore the system behaves quite differently at the same point in the load diagram during positive and negative load changes.

As a result, the task of on-board diagnostics is significantly more complex than the stationary diagnostics because of a series of confounding variables.

It is an object of the present invention to provide on-board diagnostics of such a system in real-time during normal driving which leads to lower maintenance costs, quicker response time for problem resolution and shorter design cycles.

According to the present invention, known adaptive techniques are applied to estimate static characteristic curves such as those observed in a workshop test facility based on observed, non-stationary everyday driving data. As a result, the aforementioned confounding variables are eliminated with a resulting estimated characteristic curve which can be compared to a reference curve.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
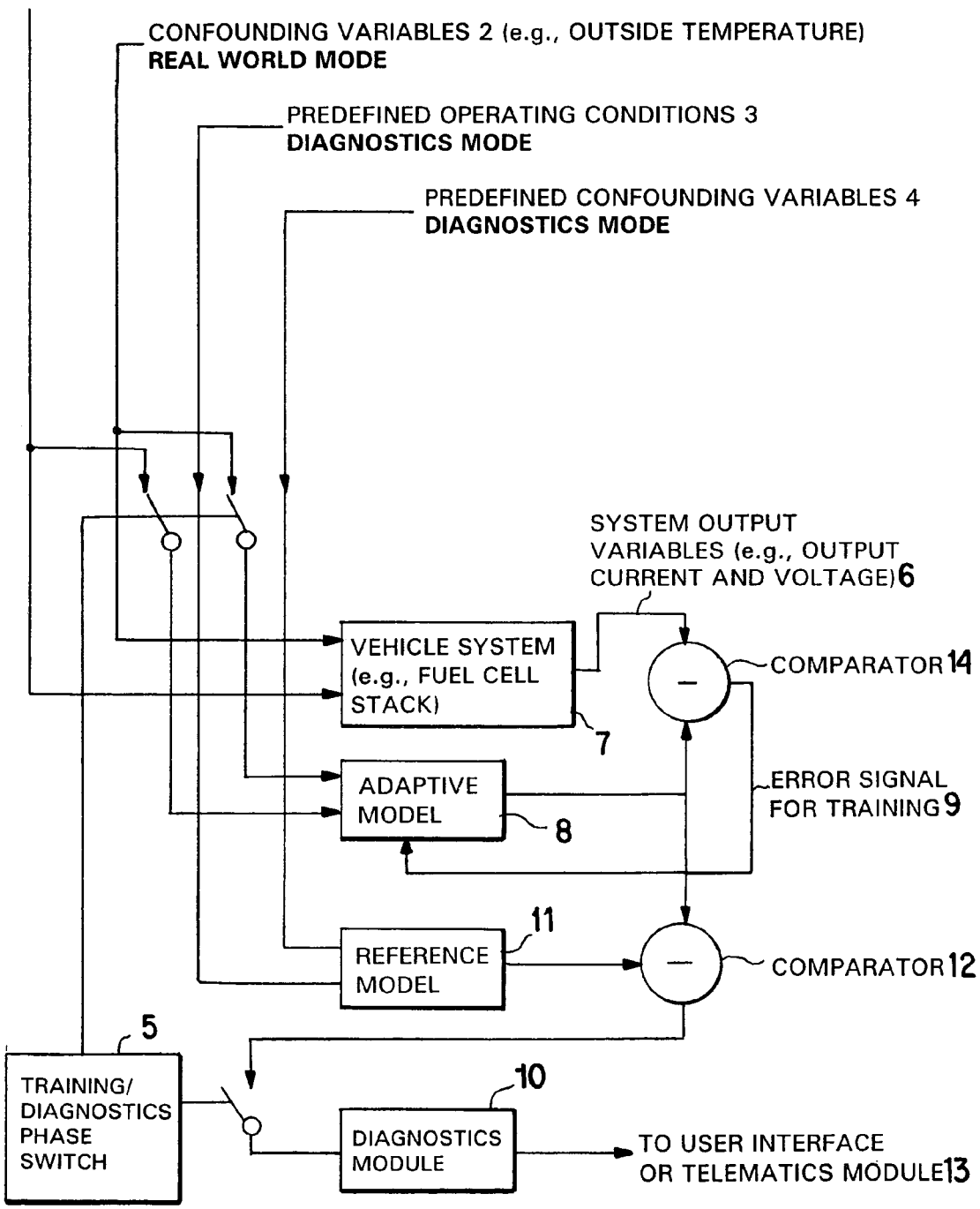
FIG. 1 illustrates a system architecture for providing real-time diagnostics according to the present invention.
Figure 2:
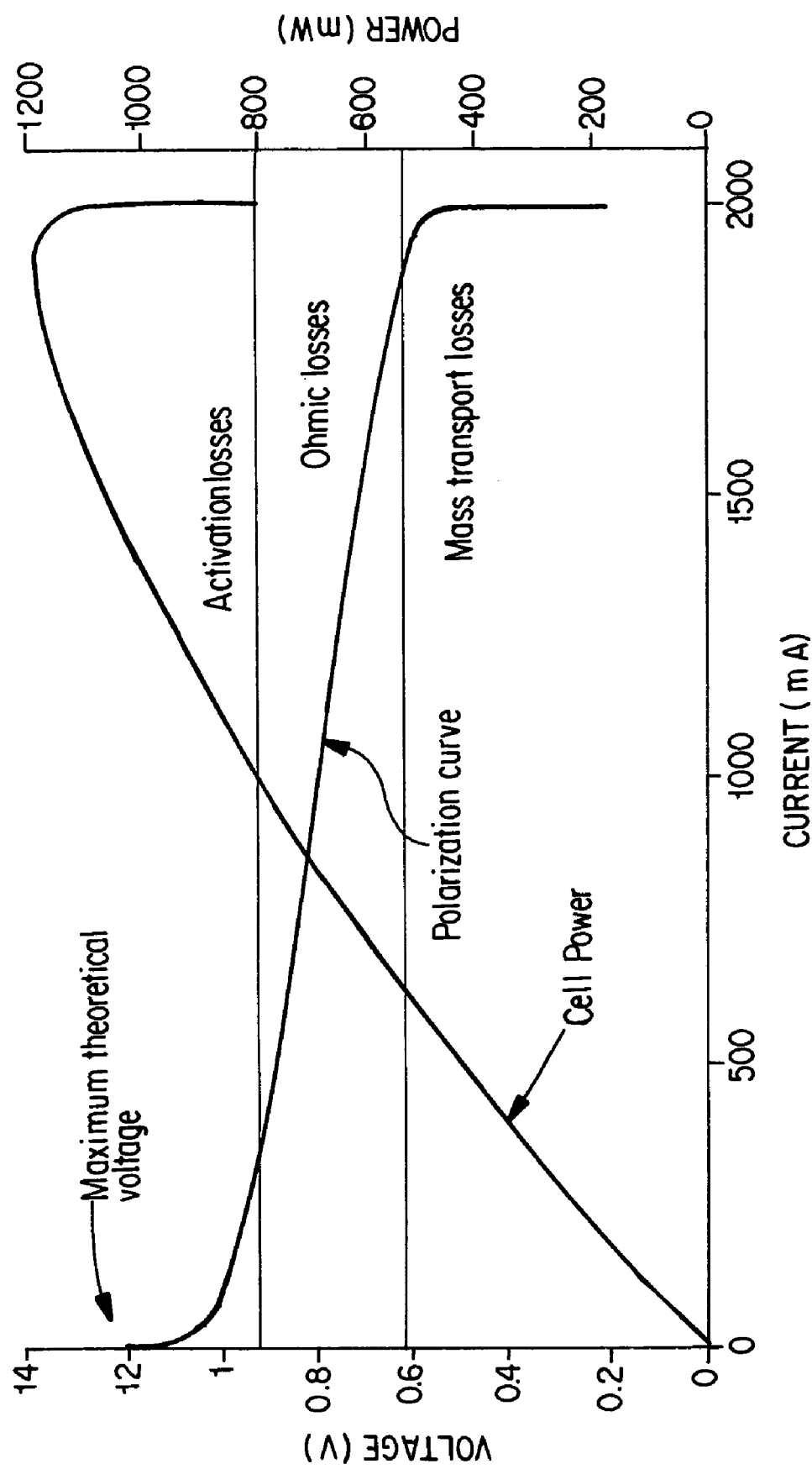
FIG. 2 is a polarization curve illustrating the effect of discharging current from a fuel cell system on the cell voltage and power.
Figure 3:
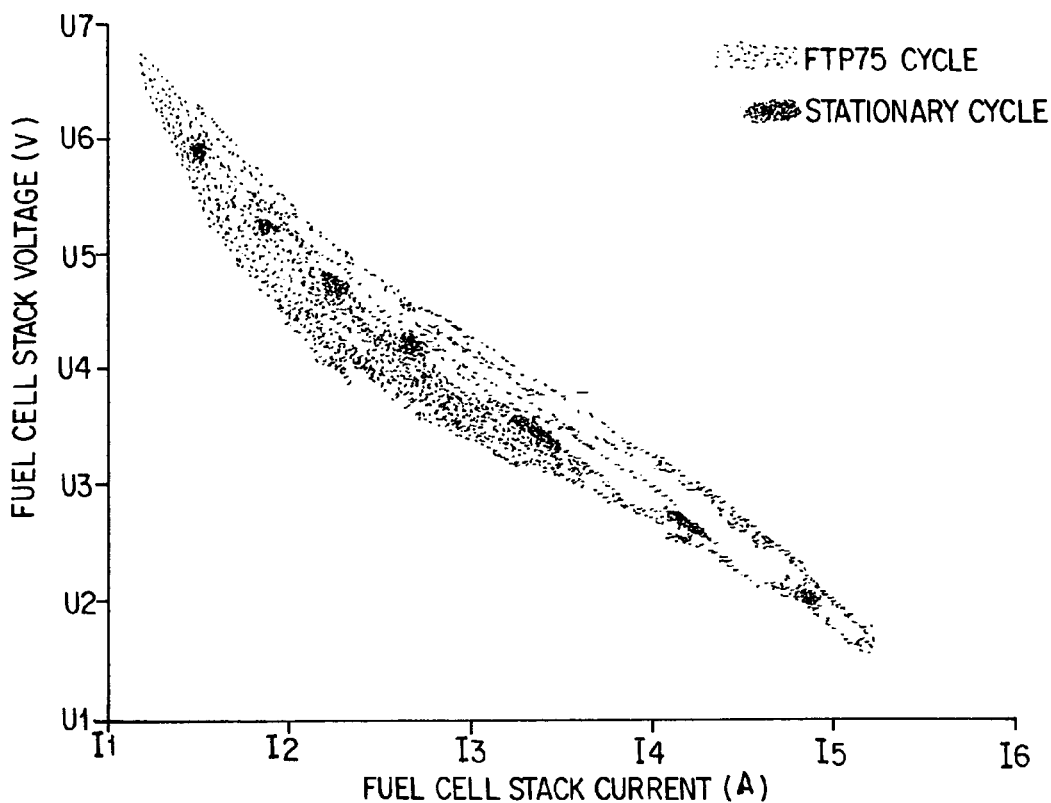
FIG. 3 illustrates a comparison of fuel cell voltage and current between a real-world driving cycle measurement and a stationary test measurement.

The reference model 11 of FIG. 1 contains a design specification for reference behavior of the vehicle component 7 in terms of prescribed output variables 6 which can include, for example, the fuel cell output, as a function of a number of independent and/or input variables 1. Examples of these input independent variables are gas pressures and gas flows. During normal driving operations, a number of additional confounding variables 2, such as the outside temperature, blur the clear functional relationship which would exist if the device were bench tested in a workshop.

The present invention has a goal of estimating the input-output behavior of the vehicle component operating under the reference input conditions, based on its currently observed behavior with varying environmental conditions. With such a predictive curve, the diagnostic module 12 functions to reduce the detected deviations from a stored "ideal" curve. The detection of these deviations is accomplished by the adaptive module component 8 which is implemented using any one of a series of machine learning techniques known in the art such as described in Principles of Data Mining (Adaptive Computation and Machine Learning) by David J. Hart et al and Data Mining: Practical Machine Learning Tools and Techniques with Java Implementation by Ian H. Witten and Eibe Franks. Generally speaking the learning component can be model-based, black-box, or a hybrid between these two extremes. Model based diagnosis has difficulty with complex technical systems because, even with a complete specification, it is difficult to tune the large number of parameters in order to realistically capture observed dependencies. The present invention uses an approach which employs general-purpose function modeling with an informed choice of the relevant input and output attributes. Therefore, by using adaptive curve fitting techniques in this manner it is possible to capture the "characteristic curves" of a system while also having the added benefit of being able to be used in multidimensional spaces as well as for continuous ranges of all input variables. In a particular embodiment for fuel cell application, the present invention uses the class of three-layer feed-forward neural networks.

The learning component is fed not only with the characteristic independent variables 1, but also with the confounding variables 2 (such as outside temperature). The system is able to assume an online learning scenario where training and diagnostics phases are interleaved using switch 5. The adaptive model 8 constantly tracks the current input-output behavior with the difference comparator 14, providing the difference between the predicted output and the actual system output. The difference signal is used as the error signal 9 for training. In order to reduce the amount of computation, it is sufficient that the learning mechanism be triggered only when the average error is constantly increasing and eventually exceeds a given threshold.

The diagnostics phase only occurs when the average error is below the threshold. This indicates that the adaptive component 8 accurately models the real system 7. Diagnostics can be performed in regular time intervals or by explicit request from a user. The derived functional model 8 is able to indicate how the system would behave under prespecified conditions of the workshop test bed. In order to provide this function, the functional model 8 is fed values for the confounding variables 4 according to the specification of the workshop tests while varying the independent variables 3 in order to study its simulated output. In the instance of fuel cell diagnostics, this can be achieved by setting the stack temperature and the differential pressure (hydrogen to air side) to a fixed value for a certain output power or by using the same exact values for input variables as previously seen under workshop conditions. On the basis of the comparison by comparator 12 between a reference curve and the estimated curve, the diagnostics module 10 can either inform the driver using a Human Machine Interface (HMI) or send the result of the analysis to a data center using wireless communication where it can, in turn, be fed back to technicians and design engineers.

Figure 4:
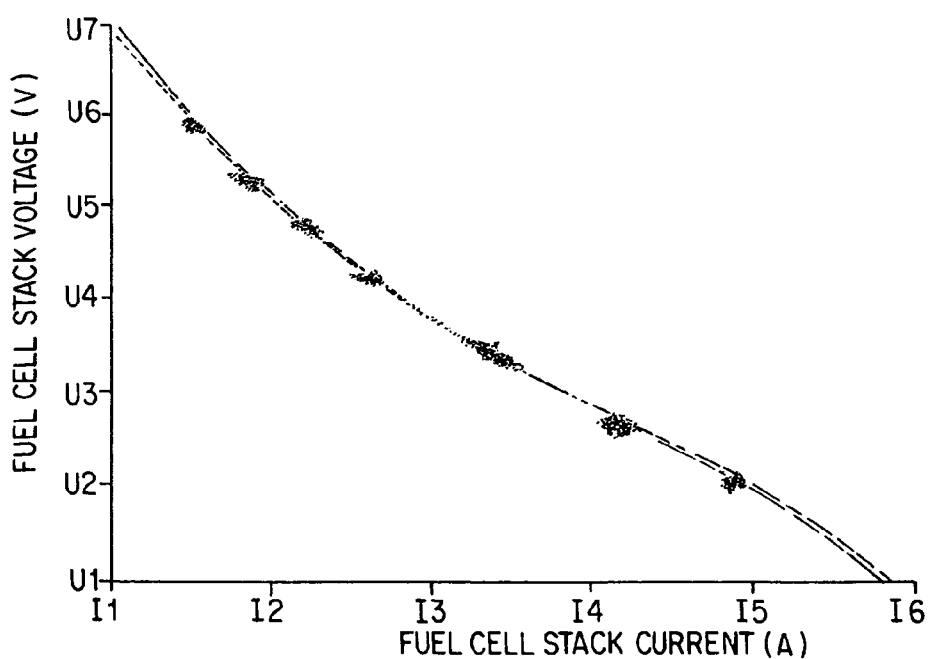
FIG. 4 illustrates a comparison of data from a stationary test and from neural network prediction during real-world operation, according to the present invention.

A comparison of the stationary test data recorded on the workshop test bed with values estimated by the neural network which was trained with everyday driving data recorded on the same day as the workshop test is shown in FIG. 4. The same input data is fed into each test. From the location of the areas of uncertainty, as far as their size and shape, it is to be noted that there is quite an accurate agreement between the two tests. Upon interpolation of both sets of data the resulting curves are satisfactory for diagnostic purposes because having a narrow band or a single line as a reference only requires minor onboard diagnostics algorithms to determine if the current real time powertrain data provides a tolerance band indicating "satisfactory" or "healthy" conditions.

The above described onboard diagnostic enables a speed-up in the development cycle of new technologies because design engineers can be provided feedback data concerning wear, tear and failure of the monitored system in an expedited manner. Furthermore, user support and acceptance can be increased by early warning and reduced down time (predictive maintenance). Therefore, service intervals can be adjusted to actual service demand which is particular important for emerging and not yet completely mature technologies such as fuel cell cars. Additionally, the present system allows for onboard diagnostics with a significant data reduction compared to complete data recording, which is the method typically used with research fleets. Additionally, due to the automated operation, the high labor cost for manual post processing of data is significantly reduced.

The continuously created models of the powertrain in the adaptive model 8 can be transmitted over a wireless connection to a central fleet database for the purpose of observing each individual vehicle and the vehicle fleet as a whole, which is part of a statistical approach. The present system contributes to each of the goals by enabling feasible and robust on-board diagnostics systems.

The foregoing disclosure has been set forth merely to illustrate the invention and is not intended to limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for on-board real-time diagnostics of a system, said method comprising the steps:
   providing a reference model containing predefined operating conditions and predefined confounding variables of said system and outputting a reference characteristic;
   measuring real-world operating conditions and real-world confounding variables of said system and outputting a plurality of system output variables;
   providing an adaptive model input with said real-world operating conditions and said real-world confounding variables in a first phase and inputting said predefined operating conditions and said predefined confounding variables in a second phase;
   providing a first comparator for comparing said plurality of system output variables with an output of said adaptive model;
   feedback means for feeding the output of said first comparative to an input of said adaptive model during said first phase;
   providing a second comparator to compare the output of said adaptive model during the second phase with said reference characteristic output of said reference model;
   providing a diagnostics module receiving the output of said second comparator during said second phase in order to output a diagnosis of said system.

2. The method according to claim 1, further including the step of switching between said first phase and said second phase wherein said first phase is a training phase and said second phase is a diagnostics phase.

3. The method according to claim 1, wherein said reference characteristic is a series of measured response functions generated by a stationary test of said system.

4. The method according to claim 3, wherein said measured response function provides a polarization curve generated by a stationary test of a fuel cell powertrain.

5. The method according to claim 3, wherein said measured response function provide a speed/torque curve generated by a stationary test of an internal combustion engine.

6. The method according to claim 1, wherein said system is a fuel cell powertrain.

7. The method according to claim 1, wherein said real-world operating conditions and said real-world confounding variables are generated when a vehicle containing said system is being driven during normal operation.

8. The method according to claim 1, wherein said system is a mobile technical system of a vehicle.

9. An arrangement for real time diagnostics of a system, comprising:
   a reference model receiving predefined operating conditions and predefined confounding variables of said system and outputting a reference characteristic;
   means for inputting to said system real-world operating conditions and real-world confounding variables of said system wherein the output of said system provides system output variables;

an adaptive model receiving, in a first phase, said real-world operating conditions and said real-world confounding variables and, in a second phase said predefined operating conditions and said predefined confounding variables to provide a first output during said first phase and a second output during said second phase;

first comparator means for comparing said system output variables with said first output of said adaptive model;

feedback means receiving an output of said first comparator means and feeding said output to said adaptive model during said first phase;

second comparator means for comparing an output of said reference model with the second output of said adaptive model during said second phase;

a diagnostics module receiving an output of said second comparator during said second phase;

switching means for switching between said first and second phase.

10. The arrangement according to claim 9, wherein said first phase is a training phase and said second phase is a diagnostics phase.

11. The arrangement according to claim 9, wherein said reference characteristics are a series of measured response functions generated by a stationary test of said system.

12. The arrangement according to claim 11, wherein said measured response functions provide a polarization curve generated by a stationary test of a fuel cell powertrain.

13. The arrangement according to claim 11, wherein said measured response functions provide speed/torque curve generated by a stationary test of an internal combustion engine.

14. The arrangement according to claim 9, wherein said system is a fuel cell powertrain.

15. The arrangement according to claim 9, wherein said real-world operation conditions and said real-world confounding variables are generated from a measuring means during the normal driving operation of a vehicle containing said system.

\* \* \* \* \*